US008325420B2

(12) United States Patent
Liau

(10) Patent No.: US 8,325,420 B2
(45) Date of Patent: Dec. 4, 2012

(54) ANNULAR SOLID IMMERSION LENSES AND METHODS OF MAKING THEM

(75) Inventor: Zong-Long Liau, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 34 days.

(21) Appl. No.: 12/952,170

(22) Filed: Nov. 22, 2010

(65) Prior Publication Data

US 2011/0122498 A1    May 26, 2011

Related U.S. Application Data

(60) Provisional application No. 61/263,867, filed on Nov. 24, 2009.

(51) Int. Cl.
*G02B 21/02* (2006.01)
*G02B 9/00* (2006.01)

(52) U.S. Cl. ........................................ 359/661; 359/738

(58) Field of Classification Search .................. 359/626, 359/656, 661, 664, 719, 724, 738
See application file for complete search history.

(56) References Cited

U.S. PATENT DOCUMENTS

| | | | | |
|---|---|---|---|---|
| 5,838,502 | A | * | 11/1998 | Park et al. ..................... 359/738 |
| 7,061,693 | B2 | * | 6/2006 | Zalevsky ....................... 359/738 |
| 2004/0027707 | A1 | | 2/2004 | Legrand et al. |
| 2007/0081426 | A1 | | 4/2007 | Lee et al. |

FOREIGN PATENT DOCUMENTS

| | | |
|---|---|---|
| JP | 2002-048976 A | 2/2002 |
| JP | 2002-174587 A | 6/2002 |

OTHER PUBLICATIONS

Lincoln Laboratory Journal, Massachusetts Institute of Technology, "Going Beyond Limits", vol. 18, N1, pp. 6-8; posted Jan. 2009, and accessed Oct. 23, 2009 at url: http://ll.mit.edu/publications/labnotes/goingbeyondlimits.html.

* cited by examiner

*Primary Examiner* — David N Spector
(74) *Attorney, Agent, or Firm* — Lando & Anastasi, LLP

(57) ABSTRACT

A sub-millimeter solid immersion lens (SIL), comprises a body of a high-index material transparent to electromagnetic radiation in a frequency band to be observed, the body having a flat bottom surface which receives an object to be observed, and the body further having a first upper surface whose limits approximate a zone of a spherical segment and a second upper surface defined by an upper bound of the zone of the spherical segment which prevents passage of electromagnetic radiation in the frequency band to be observed. The SIL may be incorporated into an array, according to other aspects. A method of making a SIL comprises: providing a substrate layer of a high-index material transparent to electromagnetic radiation in a frequency band to be observed, having a lower surface through which an object is observed; etching a surface of the substrate layer to form a first upper surface whose limits approximate a zone of a spherical segment; etching a surface of the substrate layer to form a second upper surface; treating the second upper surface to prevent transmission of the electromagnetic radiation in the frequency band to be observed; and treating the lower surface to absorb electromagnetic radiation in the frequency band to be observed, leaving untreated a hole defined therein to form a sampling port at which the object is positioned.

20 Claims, 3 Drawing Sheets

ANNULAR SOLID IMMERSION LENSES AND METHODS OF MAKING THEM

FEDERALLY SPONSORED RESEARCH

The invention was made with Government support under Grant No. FA8721-05-C-0002 awarded by the US Air Force. The Government has certain rights in the invention.

BACKGROUND OF INVENTION

Solid immersion lens (SIL) technology was developed for fields such as optical microscopy and read/write heads for high-density optical disk drives. A SIL is a lens having a higher magnification and higher numerical aperture than common lenses, where those properties are achieved by filling the space between an objective lens and a target to be observed with solid material having a high refractive index. This concept and technology derives from oil immersion lens technology commonly used with optical microscopes to achieve similar results.

Two types of SIL are commonly known, the hemispherical SIL and the Weierstrass SIL. Absent any other techniques that may be applied in concert with the SIL, the hemispherical SIL theoretically increases the numerical aperture of an optical system by n, the index of refraction of the material of the lens. The Weierstrass SIL is formed of a body of material that is a truncated sphere including more than one hemisphere of material. In the case of a Weierstrass SIL where the height of the truncated sphere is $$\left(1+\frac{1}{n}\right)r,$$

where r is the radius of the sphere and n is the index of refraction of the material, the numerical aperture can be increased by as much as $n^2$.

SUMMARY OF INVENTION

According to aspects of an embodiment, a sub-millimeter solid immersion lens (SIL), comprises a body of a high-index material transparent to electromagnetic radiation in a frequency band to be observed, the body having a flat bottom surface which receives an object to be observed, and the body further having a first upper surface whose limits approximate a zone of a spherical segment and a second upper surface defined by an upper bound of the zone of the spherical segment which prevents passage of electromagnetic radiation in the frequency band to be observed.

According to aspects of another embodiment, a sub-millimeter solid immersion lens (SIL) array, comprises an array of bodies, each body of a high-index material transparent to electromagnetic radiation in a frequency band to be observed, each body having a flat bottom surface which receives an object to be observed, and each body further having a first upper surface whose limits approximate a zone of a spherical segment and a second upper surface defined by an upper bound of the zone of the spherical segment which prevents passage of electromagnetic radiation in the frequency band to be observed.

According to aspects of yet another embodiment, a method of making a sub-millimeter solid immersion lens (SIL), comprises: providing a substrate layer of a high-index material transparent to electromagnetic radiation in a frequency band to be observed, having a lower surface through which an object is observed; etching a surface of the substrate layer to form a first upper surface whose limits approximate a zone of a spherical segment; etching a surface of the substrate layer to form a second upper surface; treating the second upper surface to prevent transmission of the electromagnetic radiation in the frequency band to be observed; and treating the lower surface to absorb electromagnetic radiation in the frequency band to be observed, leaving untreated a hole defined therein to form a sampling port at which the object is positioned. At least a portion of the lower surface including the sampling port can be treated to enhance the coupling of light into the SIL. The lower surface can also be marked by etching or other means to provide a focusing reference, to provide an identification marking or to provide a built-in scale.

In some preferred embodiments, the light absorbing layer is applied in all areas outside the lens surface. Also, in some preferred embodiments, the lens surface is given an anti-reflection coating.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
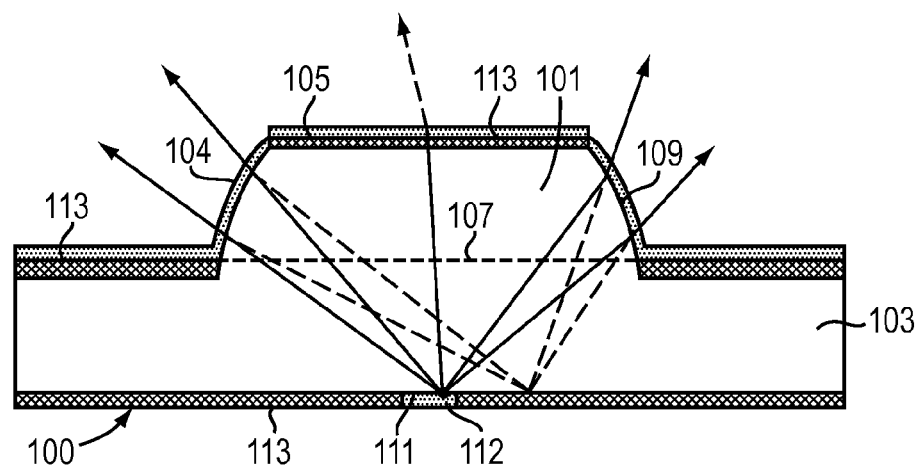
FIG. 1 is an elevation cross-section of an embodiment of a lens (optionally from an array of such lenses) according to aspects of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Conventional optical microscopes having air-incident objective lenses are widely used tools for quick examination and diagnosis, but the resolution of such systems is limited by diffraction to about half the wavelength of the light gathered from an illuminated specimen. For visible light, depending on wavelength, that limit may be from about 0.2 micrometers to about 0.3 micrometers. Oil immersion lenses and solid-immersion lenses use high-index materials between an objective lens and a specimen to improve resolution.

The established solid immersion lens (SIL) principle uses a hemisphere or larger truncated sphere made of high-index material to boost the microscope resolution. However, the commercially-available, individual, sub-millimeter SILs are highly impractical and not widely used.

According to some aspects of illustrative embodiments, a SIL is micro-fabricated in a two-dimensional array in a very high index material such as gallium phosphide (GaP) in a chip form, using steps derived from semiconductor manufacturing processes Zinc oxide (ZnO), zinc sulfide (ZnS), cadmium sulfide (CdS), gallium nitride (GaN), diamond, sapphire, quartz or glass are alternatives that can be used for visible light. These materials may require other handling and manufacturing techniques and can provide other indices of refraction. For infrared, there are other well established high index materials, such as silicon (Si), gallium arsenide (GaAs), or indium phosphide (InP). The materials listed above are exemplary; other high index materials suitable for particular wavelengths can be used, as well. The finished chip can be diced into individual lenses, for example individually located on larger flat substrates to accommodate handling, or can be used in an array form.

One method of manufacturing starts with a polished wafer of the high-index substrate material 103, and etches the desired geometry, including surfaces defining spherical segments, 101, on the polished side of the wafer. Then, the backside is polished, removing sufficient material for the plane of the polished surface to reach the centers of curvature of the surfaces defining spherical segments. The wafer is then heat treated to smooth out any roughness in the etched spherical segment surface, 109, and to anneal out any artifacts resulting from polishing the backside. Light absorbing layers 113 are then patterned on both side of the wafer. Finally, an anti-reflection 104 coating is applied to the lens surface, 109. For simplicity, this coating 104 can be applied to the entire surface. The result is a wafer of high index material having the desired geometry, as shown in and described in connection with FIG. 1, for example. Instead of a light blocking layer, a light reflecting layer can be used, but care should be exercised to avoid having reflected light bounce around undesirably. In some embodiments, because a light absorbing layer often does not absorb completely, a very thick layer can be used. As is known in semiconductor manufacturing, these steps may include related steps of applying photoresist, patterning the photoresist, stripping the photoresist, annealing and others.

In somewhat more detail, the method of making the SIL includes a sequence of steps, each of which is individually known in the art of semiconductor and microstructure processing. A wafer of high index material somewhat thicker than the finished lens array is polished on one surface. The polished surface of the wafer is then coated with etch resist, which is patterned, for example by a photolithographic process with a post flood exposure and baking for each circular photoresist pad to form a meniscus of a spherical surface, to permit etching of an array of one or more lens shapes. The surface is then etched by using an ion-beam-assisted chlorine etching to produce an array of one or more lenses whose shape in plan view is generally circular. The remaining etch resist is then stripped off the surface and the wafer annealed so as to remove stresses and smooth the final lens shapes.

It has been found that photoresist meniscuses produced when the wafer is cut from a crystal of GaP, on the conventional (1 0 0) plane have a slightly oval shape in plan view, resulting in undesired aberrations in the etched lenses. It has further been found that the aberrations can be avoided by cutting GaP crystals at an angle of about 10° to the (1 0 0) plane. The lenses produced then do not deviate from a round plan view shape to a measurable degree.

Another source of aberration resulting from manufacturing technique is a flattening of the SIL due to a slight depression in the center of the photoresist meniscus when the starting resist pad is too thin. However, a thicker resist meniscus takes a long time to etch, and can result in a very strong lens. By using an annealing step at 250 to 450 degrees C., the resist meniscus thickness can be reduced without detracting from the diameter of the etched SIL features.

FIG. 1 shows aspects of an embodiment featuring an effective annular aperture, which further increases resolution due to a narrower diffraction lobe. Combined with the high index, the total increase in resolution can be as high as a factor of 5.

Figure 2:
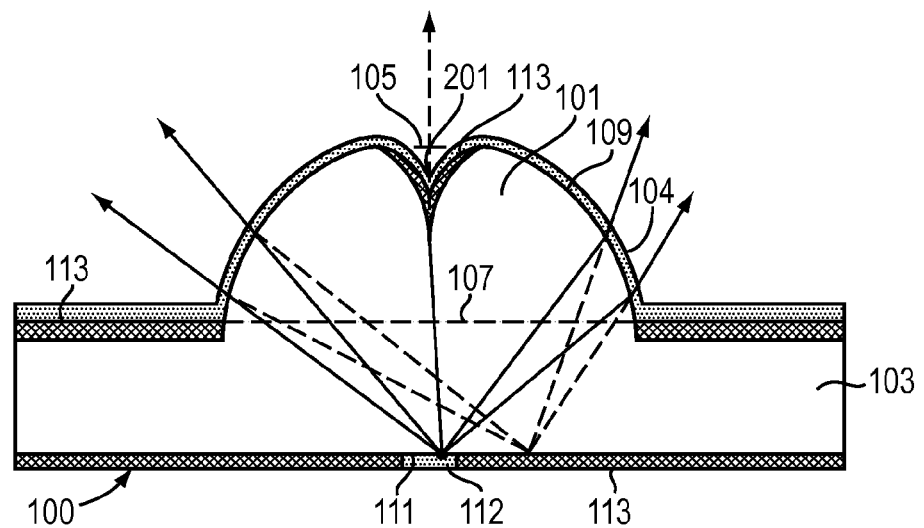
FIG. 2 is an elevation cross-section of another embodiment of a lens (also, optionally from an array of such lenses) according to aspects of the invention

As shown in FIG. 1, the lens is formed of a body, 100, of any suitable high index material transparent to the electromagnetic radiation, e.g., visible light, at a wavelength or wavelengths of interest. As mentioned above, GaP is one such material. The body may have a shape defined by a spherical segment, 101, etched onto the surface of a substrate 103, where a spherical segment, 101, is the solid defined by cutting a sphere with a pair of parallel planes, called bases, 105, and 107. The active surface of the body is the zone, 109, of the spherical segment, 101, the zone, 109, being defined by the surface of the spherical segment, 101, excluding the bases, 105, 107. According to aspects of this embodiment, the top of the body is one of the bases, 105, while the bottom of the body is the other of the bases, 107, defined at the union of the spherical segment, 101, with the substrate, 103 on which it is defined. The top of the body can optionally be shaped (FIG. 2, 201), for example by etching, to cause internal reflection to direct low-angle scattered light out of the device in a direction that minimizes the effect of such light on the observation made through the lens, such as illustrated in FIG. 2, for example. A cone-shaped body can cause the desired internal reflection. Or, any other suitable shape can be used, provided that the surface is coated, or the entire recess filled, with light absorbing material 113. Such a coating is desirable even in a geometry relying on internal reflection, so that any inadvertent light transmission by diffraction is prevented.

Figure 3:
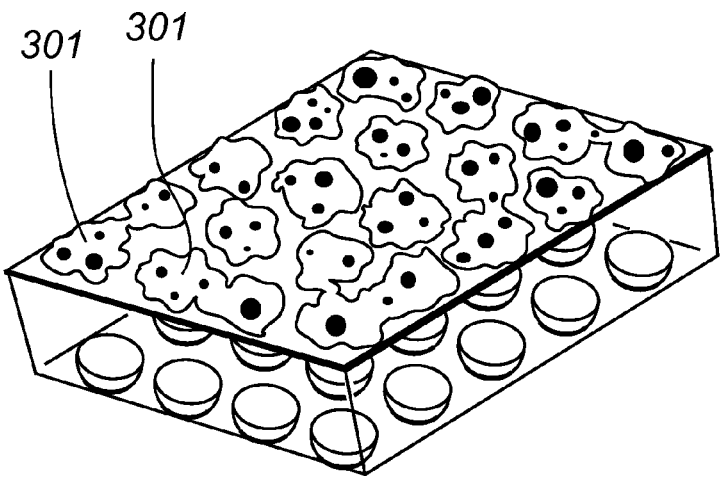
FIG. 3 is a perspective view from the bottom of a lens chip, showing the location of material to be observed deposited thereon.

This structure is simpler to fabricate than conventional structures, and there is no need to form the entire hemisphere with the required high accuracy. Lenses produced according to the inventive principles have fewer and less severe aberrations than conventional SILs because a much smaller surface having a precision finish, namely surface 109, is required for an inventive SIL as described compared to a conventional SIL having a same lens radius. Because the inventive SIL has fewer and less severe aberrations, the precision of the manufacturing tolerance of polishing the wafer to thin the wafer from the substrate side to reach the centers of curvature can be larger. Having reduced aberration can also increase the useful depth of focus, and can lead to a three-dimensional imaging capability for the inventive SIL. The inventive SIL can be shown to magnify the depth by a factor of 8, and can thus increase the depth resolution in 3D imaging. The flat or truncated top of the inventive SIL also offers more clearance with the microscope objective. The annular aperture can be used with the biology microscope whose objective lens is usually corrected for the cover slip used in the biological sample preparation, whereas the conventional SIL with the full spherical aperture will require the use of an objective lens not corrected for the cover slip. Fabrication of the inventive SIL is simpler than fabrication of conventional SILs due to the ease of handling the wafer. The resulting chip form of the product also makes certain applications much easier to implement, for example, in biological sample preparation and in microscopic examination of such samples. In particular, as shown in FIG. 3, cells can be cultured directly onto the backside of the chip, at location 301. Micro-organisms or tissue sections can also be deposited directly on the backside of the chip, at location 301, for examination like a microscope slide.

Another feature of aspects of an embodiment is a relatively small, e.g., 50 micron diameter, field-of-view opening, 111, patterned on the substrate 103 backside using a light absorptive coating, 113, to greatly reduce the background light and increase contrast. A field-of-view opening, 111, of 40, 45, 55 or 60 microns, or any other suitable size could be used for particular applications. Significant further contrast improvement is achieved by implementing a light-absorbing layer 113 on the lens top side to filter out the dominant low-angle scattered light, which otherwise forms a highly bright background. Alternative to the flat, light absorptive top surface, the top surface can be shaped to reflect the low-angle scattered light away from the observer. A coating of a light absorbing layer 113 is still desired, for a total elimination of diffracted light. This built-in high-contrast capability is highly advantageous, since conventional optical microscopy of biological samples generally suffers from low contrast.

Figure 4:
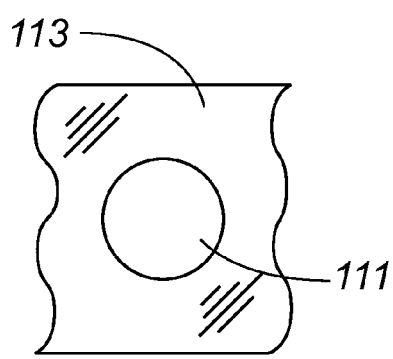
FIG. 4 is a perspective view from the bottom of a lens chip, showing a round field of view opening.
Figure 5:
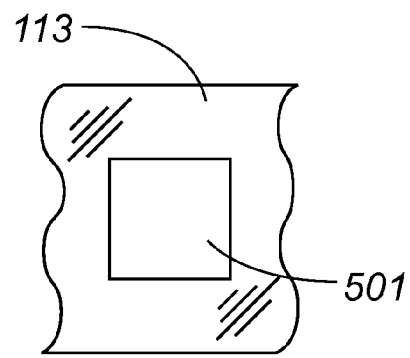
FIG. 5 is a perspective view from the bottom of a lens chip, showing a rectangular field of view opening.
Figure 6:
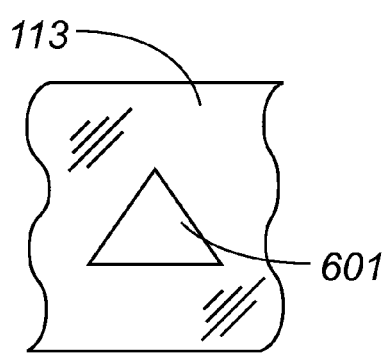
FIG. 6 is a perspective view from the bottom of a lens chip, showing a triangular field of view opening.
Figure 7:
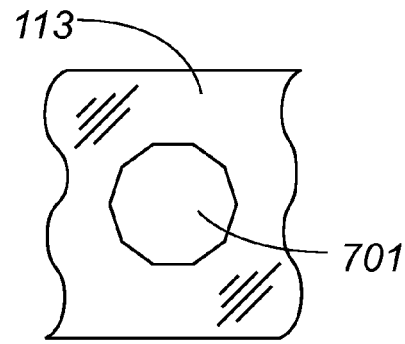
FIG. 7 is a perspective view from the bottom of a lens chip, showing a multifaceted field of view opening.

The field of view opening is shown in several alternatives in FIGS. 4, 5, 6, and 7. FIG. 4 shows a round opening, 111. It has further been found that for some applications the shape of the field-of-view opening, 111, should not be round. The round window can interact with the generally round floor plan of the SIL to produce undesired optical coherence and interference. In order to minimize such undesired optical coherence and interference, as shown in FIG. 5, a rectangular window 501 can be used. Other window shapes, such as triangular (FIG. 6, 601) or other multifaceted windows (FIG. 7, 701) can also be used.

Figure 8:
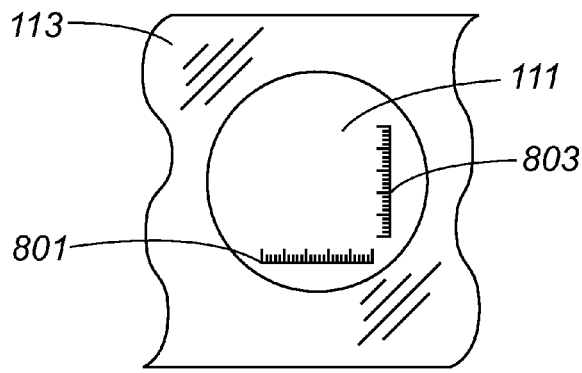
FIG. 8 is a detail showing the field of view opening, having etched markings within.

A coating of a layer (or layers) 112 of suitable refractive index and thickness, similar to the conventional anti-reflection coatings used in other lens applications, may increase light coupling into the high-index SIL material. This layer 112 can increase the SIL image brightness. Marks can be patterned or etched in the field of view opening, for focusing reference, identification marking or built-in scale purposes, as shown in FIG. 8, 801 and 803.

Figure 9:
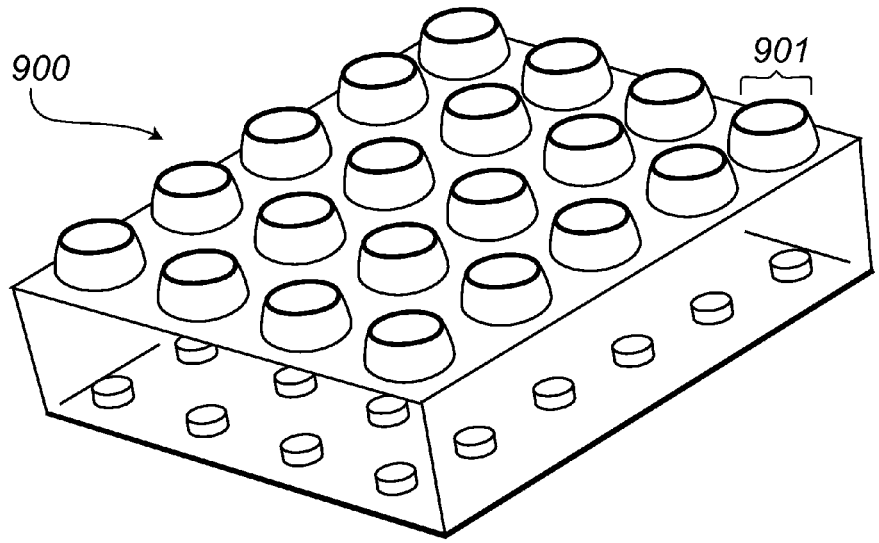
FIG. 9 is a perspective view from the top of a lens chip, showing an array of multiple lenses.

The devices are fabricated in large arrays in a wafer by using the batch processing techniques known in the semiconductor arts. The resultant chip (FIG. 9, 900) contains multiple devices (FIG. 9, 901) for increased sampling, compensating the limited field of view of each individual device. The biological samples are deposited directly on the backside of the chip, satisfying the close-contact requirement. For example, the biological samples can be grown directly on the backside of the chip, resulting in direct contact between an extremely thin sample and the SIL. Thin samples are desired in order to reduce interference with portions in the sample within the depth of focus by portions in the sample outside the depth of focus. When samples are produced as tissue sections or by other means which result in somewhat thicker samples, after the sample is applied to the backside of the chip, the chip can be exposed to an oxygen plasma which will remove layers of the sample, thus thinning it out.

The chip can then be used like a slide for examination in a conventional optical microscope. The present invented device can thus be mass-produced for practical uses, and therefore has considerable commercial potential.

Figure 10:
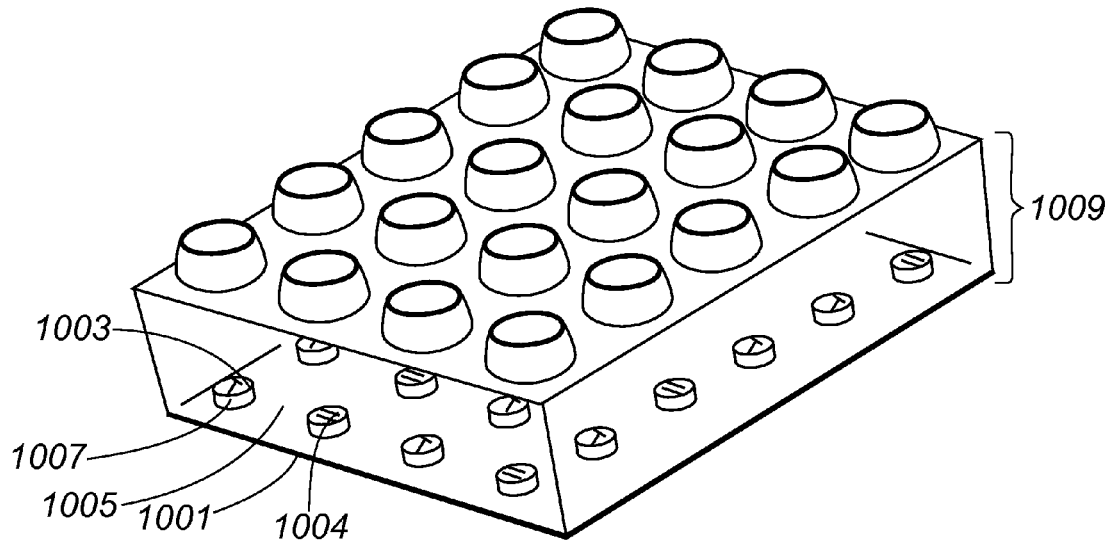
FIG. 10 is a perspective view from the top of a lens chip constructed on the surface of a semiconductor device having optical test structures and optically sensitive structures.

Because it is made by conventional semiconductor processing steps, the SIL of the present invention can be formed in a layer formed on a semiconductor device (FIG. 10, 1001), so as to provide novel inspection means or other functions requiring microscopic optics. For example, optical test structures (FIG. 10, 1003) or light detecting or generating devices (FIG. 10, 1004) can be formed on the semiconductor device surface, under the SIL layer (FIG. 10, 1001). The entire semiconductor surface can be blacked out with light absorbing material (FIG. 10, 1005), except for an opening (FIG. 10, 1007) over each test structure (FIG. 10, 1003) or light detecting or generating device (FIG. 10, 1004), over which the SIL structure (FIG. 10, 1009) is formed. The test structure (FIG. 10, 1003) can then be optically examined before the device is packaged. Light can be directed onto or from light detecting or generating devices (FIG. 10, 1004) while the semiconductor device is in use.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A solid immersion lens (SIL), comprising:
a body of a high-index material transparent to electromagnetic radiation in a frequency band to be observed, the body having a flat bottom surface which receives an object to be observed, and
the body further having a first upper surface whose limits approximate a zone of a spherical segment and a second upper surface defined by an upper bound of the zone of the spherical segment which prevents passage of electromagnetic radiation in the frequency band to be observed.

2. The SIL of claim 1, the second upper surface further comprising:
a material which either blocks or absorbs electromagnetic radiation in the frequency band to be observed.

3. The SIL of claim 1, wherein the body includes a flat substrate having a surface upon which the zone of the spherical segment is disposed, the flat substrate further comprising:
a material which either blocks or absorbs electromagnetic radiation in the frequency band to be observed.

4. The SIL of claim 1, wherein the high index material is GaP.

5. The SIL of claim 1, further comprising:
a biological sample disposed on the flat bottom surface as the object to be observed.

6. The SIL of claim 1, wherein an anti-reflecting material is disposed on the body.

7. The SIL of claim 1, the flat bottom surface further comprising:
a material which either blocks or absorbs electromagnetic radiation in the frequency band to be observed, having a hole defined therein to form a sampling port at which the object to be observed is positioned.

8. The SIL of claim 7, further comprising:
a layer on a surface of the sampling port to increase light coupling into the SIL.

9. The SIL of claim 7, further comprising:
marks observable by microscopic examination during use of the SIL, provided on a surface of the sampling port by patterning or etching.

10. The SIL of claim 7, wherein the second upper surface is further defined to have a shape which produces internal reflections of electromagnetic radiation in the frequency band to be observed arriving from the object to be observed and directed toward the material which absorbs electromagnetic radiation in the frequency band to be observed.

11. A solid immersion lens (SIL) array, comprising:
an array of bodies, each body of a high-index material transparent to electromagnetic radiation in a frequency band to be observed, the array having a flat bottom surface which receives at least one object to be observed, and each body further having a first upper surface whose limits approximate a zone of a spherical segment and a second upper surface defined by an upper bound of the zone of the spherical segment which prevents passage of electromagnetic radiation in the frequency band to be observed.

12. The SIL array of claim 11, the second upper surface further comprising:
a material which either blocks or absorbs electromagnetic radiation in the frequency band to be observed.

13. The SIL array of claim 11, wherein each body includes a flat substrate on which the zone of the spherical segment is disposed, the flat substrate further comprising:
a material which either blocks or absorbs electromagnetic radiation in the frequency band to be observed.

14. The SIL array of claim 11, wherein the high index material is GaP.

15. The SIL array of claim 11, further comprising:
a biological sample disposed on the flat bottom surface as the object to be observed.

16. The SIL of claim 11, wherein an anti-reflecting material is disposed on the body.

17. The SIL array of claim 11, the flat bottom surface further comprising:
a material which absorbs electromagnetic radiation in the frequency band to be observed, having an array of holes defined therein to form sampling ports at which the objects to be observed are positioned.

18. The SIL array of claim 17, further comprising:
a layer on a surface of the sampling port to increase light coupling into the SIL.

19. The SIL array of claim 17, further comprising:
marks observable by microscopic examination during use of the SIL, provided on a surface of the sampling port by patterning or etching.

20. The SIL array of claim 17, wherein the second upper surface is further defined to have a shape which produces internal reflections of electromagnetic radiation in the frequency band to be observed arriving from the object to be observed and directed toward the material which absorbs electromagnetic radiation in the frequency band to be observed.

* * * * *